United States Patent [19]

Spillman

[11] 4,444,367
[45] Apr. 24, 1984

[54] AEROFOIL BODIES

[75] Inventor: John J. Spillman, Bedford, England

[73] Assignee: National Research Development Corporation, London, England

[21] Appl. No.: 247,113

[22] Filed: Mar. 24, 1981

[30] Foreign Application Priority Data

Mar. 25, 1980 [GB] United Kingdom ............... 8009253

[51] Int. Cl.³ .......................................... B64C 23/06
[52] U.S. Cl. ................................................ 244/199
[58] Field of Search ............... 244/199, 91, 1 TD, 87, 244/36, 45 R, 130; D12/335

[56] References Cited

U.S. PATENT DOCUMENTS

| D. 256,791 | 9/1980 | McComas et al. | 244/199 |
|---|---|---|---|
| 2,559,823 | 7/1951 | Klose | 244/87 |
| 2,576,981 | 12/1951 | Vogt | 244/91 |
| 2,740,596 | 4/1956 | Lee | 244/199 |
| 2,775,419 | 12/1956 | Hlobil | 244/35 |
| 3,270,988 | 9/1966 | Cone, Jr. | 244/35 |
| 3,310,262 | 3/1967 | Robins et al. | 244/45 |
| 3,369,775 | 2/1968 | Rethorst | 244/41 |
| 3,693,913 | 9/1972 | Barland, Sr. | 244/130 |
| 3,960,345 | 6/1976 | Lippert, Jr. | 244/130 |
| 3,984,070 | 10/1976 | Patterson, Jr. | 244/130 |
| 4,050,397 | 9/1977 | Vanderleest | 114/274 |
| 4,067,518 | 1/1978 | Paterson et al. | 244/130 |
| 4,190,219 | 2/1980 | Hackett | 244/199 |
| 4,293,110 | 10/1981 | Middleton et al. | 244/199 |
| 4,377,267 | 3/1983 | Haworth | 244/199 |

FOREIGN PATENT DOCUMENTS 1019061  2/1966  United Kingdom ............... 244/130

Primary Examiner—Sherman D. Basinger
Assistant Examiner—Ivy M. Shum
Attorney, Agent, or Firm—Cushman, Darby & Cushman

[57] ABSTRACT

An aerofoil body, for example a "delta" wing aircraft, in which strip-form devices project rearwards from the trailing edge of the wing and serve to improve the lift-to-drag ratio of the body, in some conditions of flight at least, by modifying the formation of the trailing edge vortex to allow the axes of the primary vortex sheets to lie closer to the fore-and-aft centerline of the body than would otherwise be the case. When the strips are basically flat in shape, the strips may project straight backwards from the trailing edge or may be angled in various ways. The use of twisted strips is also described.

12 Claims, 8 Drawing Figures

AEROFOIL BODIES

BACKGROUND OF THE INVENTION

This invention relates to aerofoil bodies. It relates in particular to aircraft wings of the kind presenting leading edges that are strongly swept relative to the direction of motion of the craft through the surrounding air. An extreme and relatively familiar version of such a wing is the so-called "delta" wing, the plan shape of which approximates to an isosceles triangle. Other known versions of such a wing have curved leading edges, and the wing tips need not be pointed.

In the accompanying drawings FIG. 1 is a diagrammatic perspective view of such a wing, and FIG. 2 illustrates the spanwise lift distribution of such a wing diagrammatically. In FIG. 1 a "delta" wing 1 presents leading edges 2, 3 and a trailing edge 4. Reference 5 indicates the fore-and-aft centreline of the wing in flight, and arrow 6 the "free stream" direction of the surrounding fluid relative to the wing in use. It is well known that when such a wing is placed at a positive incidence to an airflow it will develop a pattern of flows in which vortex sheets, separating from close to the swept leading edges, will roll up to form two strong coiled vortex sheets approximately conical in form. Such sheets are indicated by references 7 and 8. Secondary vortex sheets, as indicated by references 9 and 10, may also form between the main sheets and the leading edges: however the size of the secondary sheets is very much smaller and consequently their effects are small also. The axes of vortex sheets 7 and 8 are indicated at 11 and 12, and it will be seen that they lie above wing 1 and inboard of leading edges 2 and 3: regions of low pressure are induced against the top surface of the wing underneath these axes. At all but very low incidences the lift distribution across the span of such a wing is as illustrated in FIG. 2 and it is well known that as incidence increases, the peak lift values 13 occurring immediately beneath axes 11, 12 increase more rapidly than the lift value 14 which occurs over wing centreline 5.

However, relative motion between the wing and the surrounding fluid causes vortex sheets to be shed not only above the surface of the wing itself, but also downstream of the trailing edge of the wing. The present invention arises from appreciating that the trailing edge vortex sheet can be modified with good effect. FIG. 3 of the accompanying drawings illustrates such a vortex sheet formation schematically. As a result generally of the spanwise lift distribution illustrated in FIG. 2, and particularly of the fact that maximum lift does not coincide with centreline 5, the sign of the vorticity of the vortex sheet 7 once shed downstream from trailing edge 4 varies across the span of the wing. FIG. 3 illustrates the condition of the part 15 of the sheet just inboard of the line of maximum lift created by the axis 11 of the sheet and it will be seen that the sign of the vortex at this part of the sheet is opposite to the sign of the more forward and outward part 15a. At moderate and greater incidences this difference in sign has the effect of keeping axis 11 of vortex sheet 7 closer to leading edge 7, and thus further from centreline 5, than would be the case if the strength of part 15 of the sheet were less. This is disadvantageous: ideally maximum lift should occur at the centre.

SUMMARY OF THE INVENTION

The present invention proposes a simple modification to the wing which may delay and modify the formation of the trailing edge vortex, and thus allow the axes of the primary vortex sheets to lie closer to the centreline of the body. According to the invention an aerofoil body adapted in use to move relative to a surrounding mass of fluid, and to present a trailing edge and at least one swept leading edge relative to that motion, carries at least one strip-form device which projects rearwardly from the trailing edge so as to modify the vortex sheets generated by the interaction of the edges with the fluid and so to improve the lift-to-drag ratio of the body. The dominant action of the strips may be to modify the generation of trailing edge vortex sheets, and so bring about the result that the region of maximum lift generated by the leading edge vortices is closer to the centreline of the body that would otherwise be the case. This leads to less drag, and more generated lift, and hence a higher lift-to-drag ratio.

The body may be of triangular or "delta" shape in plan, and two strips may project from the trailing edge: the length dimension of each strip may lie parallel to the fore-and-aft centreline of the body and two strips may project from the trailing edge on opposite sides of the centreline. For a body of such plan shape each strip may project from the edge at a position substantially 0.6 of the distance between the centreline and the adjacent tip of the trailing edge. The projecting fore-and-aft length of such strips may be of the order of 35% of the trailing edge span, and the spanwise dimension of such strips may be of the order of 4% of the trailing edge span.

Such strips may lie substantially in the plane of the mean chord of the aerofoil body, or may alternatively project from the trailing edge of the body at an angle, either upward or preferably downward, to that chord.

Such strips may be flat but may also be twisted: for instance at the root of the strip, where it is attached to the surface of the body, the surfaces of the strip and the body may be parallel to each other, but the strip may be twisted along its length so that at its free end its surface lies in a perpendicular direction. The hand of the twist may be such that in proceeding from the root to the free end the inboard edge of the strip rises relative to the plane of the mean chord of the body.

In an alternative construction according to the invention the strip may be flat but the plane of its surface lies perpendicular to the plane of the mean chord of the body throughout, and in this alternative version the plane of the surface of the strip preferably lies parallel to the adjacent swept leading edge of the body.

The invention is defined by the claims, the content of which should be considered as forming part of the disclosure of this specification, and the invention will now be described, by way of example, with reference to the further accompanying drawings in which:

DETAILED DESCRIPTION OF THE PREFERRED EMBODIMENTS

Figure 4:
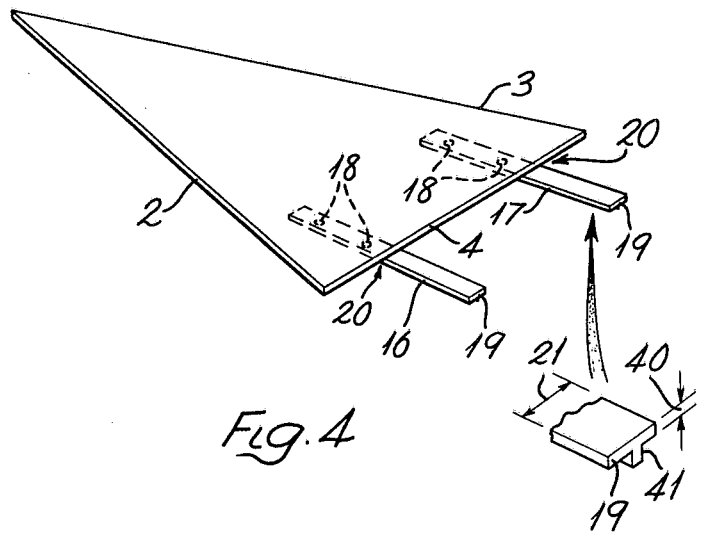
FIG. 4 is a diagrammatic and perspective view of an aerofoil body and includes an enlarged fragment.

FIG. 4 shows an aerofoil body in the form of a "delta" wing 1 with leading edges 2, 3 and a trailing edge 4. Flat strip-form devices 16, 17 are attached to the body by rivets or other suitable means (indicated diagrammatically at 18) so as to project rearwardly from trailing edge 4 in a direction parallel to the fore-and-aft centreline 5 of the body. Reference 19 indicates the free, rearward tip of each strip and reference 20 the "root" of each strip, by which is meant the part of each strip coinciding with the trailing edge 4.

Figure 5:
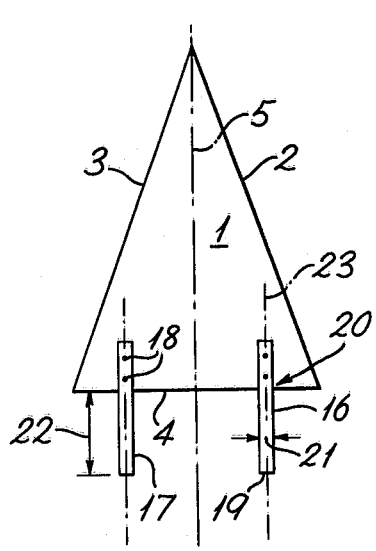
FIG. 5 is a plan view of the same body.

By describing the devices 16, 17 as "strip-form" or "strips", we mean devices of such form that the projecting length 22 is much greater than the width or spanwise dimension 21, which in turn is likely to be greater than the depth or thickness 40 (inset, FIG. 4). While the length and width dimensions may as will be described be related to other parameters of the aerofoil body in a manner so as to optimise the invention, the depth dimension 40 may tend to be dictated by strength considerations: typically, the depth dimension will be one-tenth of the width dimension or less. A cross-section through the projecting length of each device will thus typically be basically rectangular in shape, with the width dimension greater than the depth dimension, thus excluding from the invention for instance devices of near-circular cross section in which depth and width are of the same order of magnitude. However the invention does not exclude devices in which the basically rectangular section is modified, for instance by rounding the corners, or causing the section to thin towards a point at opposite ends, or fitting a small keel 41 for extra strength (inset, FIG. 4). As FIG. 5 shows most clearly, in this version of the invention the strips are attached to the body in such a way that the flat surfaces of the strips lie parallel to the surfaces of the body. For a body of the dimensions shown, in which the lengths of leading edges 2, 3 are equal and are each about 1.5 times that of the trailing edge 4, tests have suggested that especially good results are obtained when the spanwise dimension 21 of each strip is of the order of 4% of the total span of trailing edge 4, and when the length 22 of each strip from root to tip is of the order of 35% of the trailing edge span. The tests from which these conclusions have been derived have assumed an aircraft similar in form to the Saab Viggen, say, operating at subsonic speeds. However this version of the invention is, of course, not limited to bodies in which the dimensions and locations of the strips are restricted as just described. One versed in the art would rightly expect to vary both dimensions and location to suit aircraft of different shape or performance.

Figure 6:
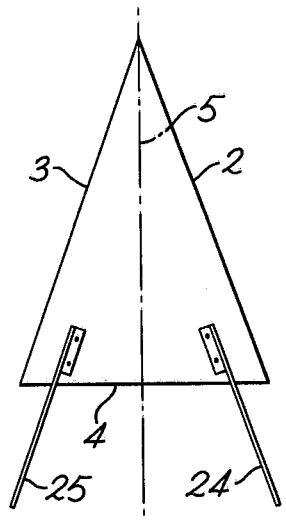
FIG. 6 is a plan view of another body.

In the versions of the invention just described with relation to FIGS. 4 and 5 of the drawings, the centrelines 23 of strips 16, 17 have been parallel to the centreline 5 of body 1. In the alternative version of the invention shown in FIG. 6 the strips 24, 25 are again flat but are arranged edge-on to the body so that the planes of the strips lie at right angles to the plane of the chords of the body, and in addition the centreline of each strip lies approximately parallel not to the body centreline 5 but to the adjacent leading edge 2 or 3. Ideally such strips will be located somewhat closer to centreline 5 than would be the case if they were mounted on the wing itself to interact with part 15a of sheet 7, because once behind the trailing edge the axis 11 of the sheet tends to change direction and become more nearly parallel to the centreline 5.

Figure 7:
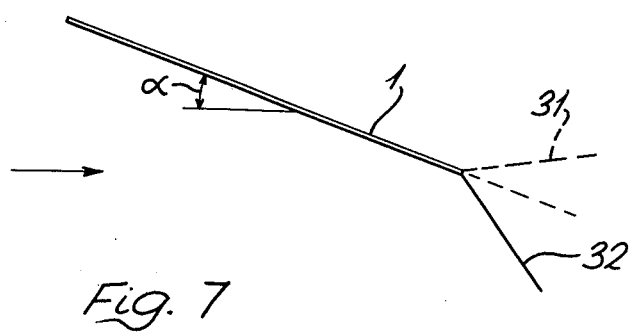
FIG. 7 is a side elevation of yet another body.

FIG. 7 illustrates the possibility that the centrelines of strips such as 16, 17 may be angled upwardly (31) or downwardly (32) relative to the plane of the mean chord of body 1, instead of lying in the same plane. Tests suggest that by angling the centrelines upwardly or downwardly as indicated in this Figure, the lift-to-drag ratio of the body 1 may be decreased or increased respectively, in a manner perhaps similar to that achieved by known trailing edge controls. Obviously it would be desirable to be able to vary the angle to match different performances of the body in normal flight, and in particular to be able to raise a strip from a downwardly-deflected condition to a level one to improve ground clearance for an aircraft wing on landing. It is also within the scope of the invention that the strips could be movable, and used as some form of control for maneuvering or trimming the aircraft in flight.

Figure 1:
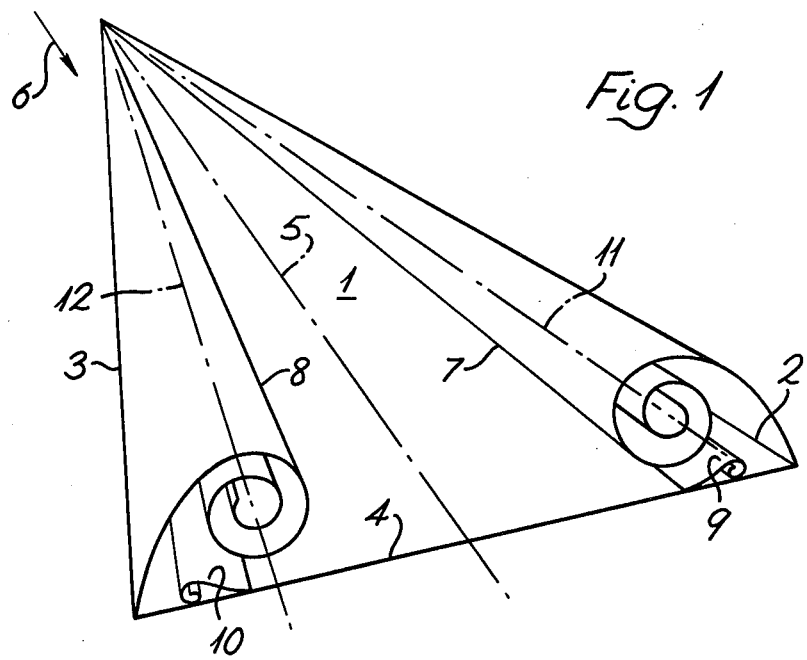
FIG. 1 is a diagrammatic perspective view of a swept wing.
Figure 2:
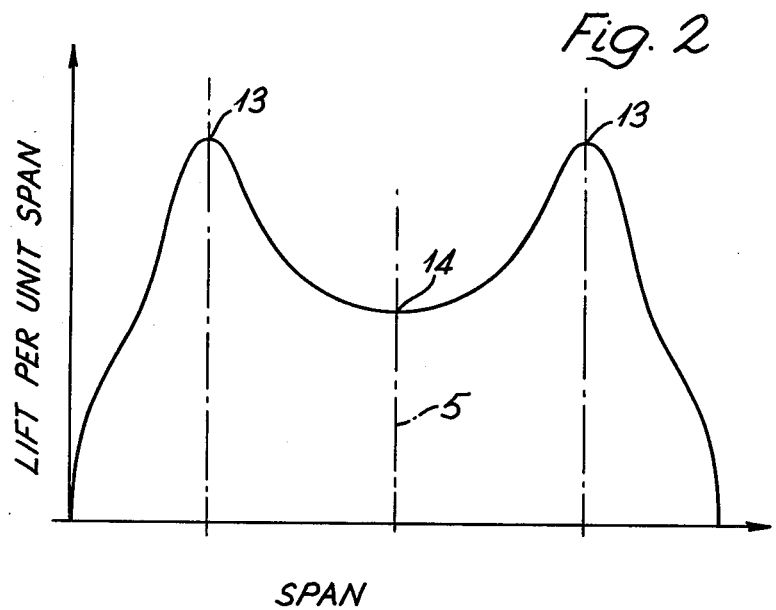
FIG. 2 illustrates a spanwise lift distribution of a wing of FIG. 1 diagrammatically.
Figure 3:
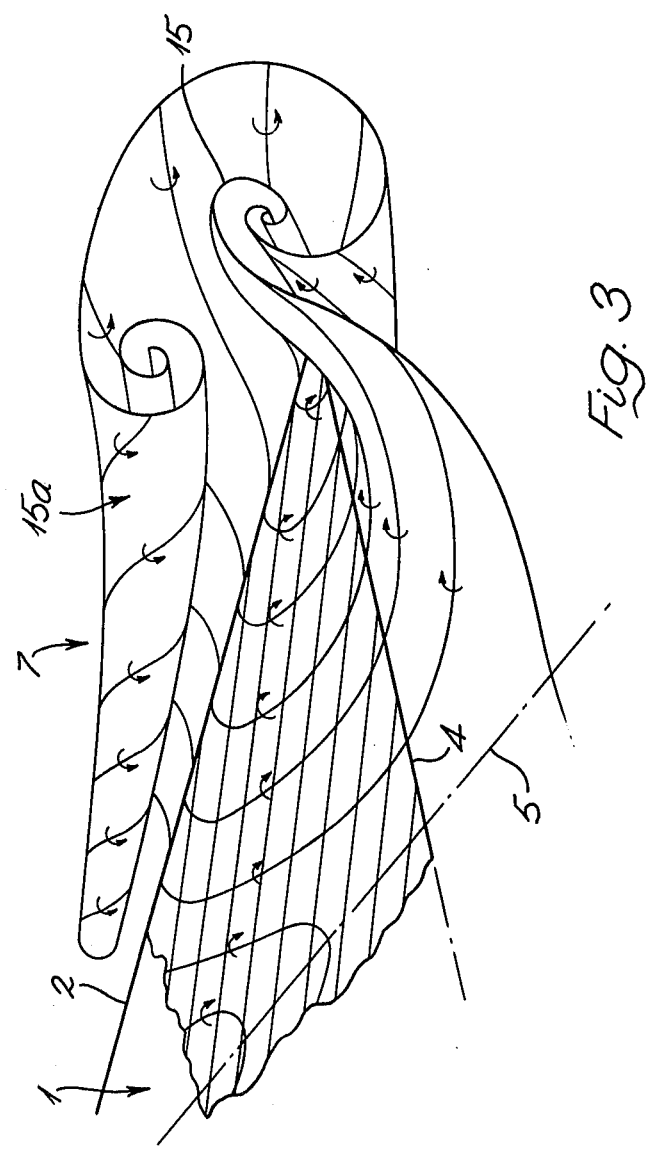
FIG. 3 illustrates a condition of a section of the wing just inboard of the line of maximum lift.
Figure 8:
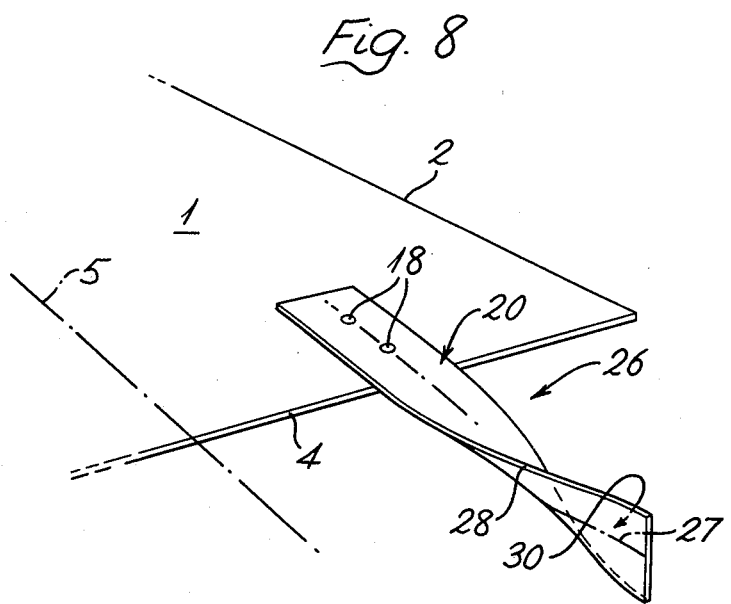
FIG. 8 is a perspective view of yet another body.

FIG. 8 shows yet another version of the invention in which two strips (of which only one, referenced 26, is shown) project straight backwards from the trailing edge 4 so that the centrelines 27 of the strips lie throughout in the plane of the mean chord of body 1. However the strips undergo a right-angle twist between their root 20, where the planes of the surfaces of body 1 and strip 26 are parallel, and their tip 19. As FIG. 8 shows, the "hand" of the twist is such that the inboard edge 28 of the strip rises between the root and the tip, and approaches closer to the adjacent leading edge 2. The possible beneficial effects of such a twist may be appreciated by referring again to FIG. 3. It will be seen that the "hand" of the twist of strip 26 is the same as that of the trailing part 15 of vortex sheet 7, and a result of this similarity can be that a region of low pressure is induced against surface 30 of the strip, at least towards the tip end of the strip. There are both forward and upward components to the direction in which this surface is facing, so valuable extra thrust may be achieved by creating low pressure against it.

I claim:

1. An aerofoil body adapted in use for motion relative to a surrounding mass of fluid and presenting:
   a fore-and-aft centerline lying parallel to said motion;
   a trailing edge relative to said motion;
   at least one swept leading edge relative to said motion, said edge presenting a spanwise tip giving rise in use to a respective primary coil-form vortex sheet;
   a single strip-form device corresponding to each said swept leading edge, each said strip-form device being mounted on said body at a location lying directly aft of at least part of said swept leading edge and projecting rearwardly from said trailing edge at a location inboard of said spanwise tip, the projecting length of each said strip being considerably greater than their spanwise dimension, with none of said strips being oriented relative to the said fore-and-aft centerline in a sense opposite to that of the sweep of said swept leading edge with which it corresponds, and each said device being so located as to modify the said coil-form vortex sheet generated by the corresponding said swept leading edge so as to improve the lift-to-drag ratio of said body.

2. An aerofoil body according to claim 1 of triangular shape in plan, presenting two said swept leading edges disposed on opposite sides of and inclined in opposite senses related to said centerline, and a single trailing edge.

3. An aerofoil body according to claim 2 in which two said strip-form devices, one associated with each of said oppositely-inclined swept leading edges, project from said trailing edge on opposite sides of said centreline and with the length of each said device parallel to said centreline.

4. An aerofoil body according to claim 3 in which each said strip-form device projects from said trailing edge at a position about 0.6 of the distance between said centreline and the adjacent tip of said trailing edge.

5. An aerofoil body according to claim 3 in which the projecting said length of said strip-form devices is about 0.35 of the span of said trailing edge.

6. An aerofoil body according to claim 3 in which the spanwise dimension of each of said strip-form devices is about 0.04 of the span of said trailing edge.

7. An aerofoil body according to claim 1 in which at least one such said strip-form device lies substantially in the plane of the mean chord of said aerofoil body.

8. An aerofoil body adapted in use for motion relative to a surrounding mass of fluid and presenting:
- a trailing edge relative to said motion;
- at least one swept leading edge relative to said motion; and
- at least one strip-form device carried by said body and projecting rearwardly from said trailing edge, said device being so oriented as to modify the vortex sheets generated by the interaction of said edges with said fluid and so to improve the lift-to-drag ratio of said body, said one strip-form device being twisted and having a free end with the hand of said twist being such that in proceeding from said attached to said free end of said device, the inboard edge of said device rises relative to the plane of the mean chord of said body.

9. An aerofoil body adapted in use for motion relative to a surrounding mass of fluid and presenting:
- a trailing edge relative to said motion;
- at least one swept leading edge relative to said motion; and
- at least one strip-form device carried by said body and projecting rearwardly from said trailing edge, said device being so oriented as to modify the vortex sheets generated by the interaction of said edges with said fluid and so to improve the lift-to-drag ratio of said body, with at least one said strip-form device being flat but the plane of its surface lying perpendicular to the plane of the mean chord of said body throughout, wherein the plane of the surface of said device also lies parallel to the adjacent swept leading edge of said body.

10. An aerofoil body adapted in use for motion relative to a surrounding mass of fluid and presenting:
- a fore-and-aft centreline lying parallel to said motion;
- a trailing edge relative to said motion;
- at least one swept leading edge relative to said motion, each edge giving rise in use to a respective primary coil-form vortex sheet;
- a single strip-form device associated with each said swept leading edge, each said swept-form device being carried by said body and projecting rearwardly from said trailing edge, with none of said strips being oriented relative to the said fore-and-aft centreline in a sense opposite to that of the sweep of said swept leading edge with which it is associated, and each said device being so located as to modify the said coil-form vortex sheet generated by the associated swept leading edge so as to improve the lift-to-drag ratio of said body, at least one of said strip-form devices projecting from said trailing edge of said aerofoil body at an angle to the mean chord of said body.

11. An aerofoil body adapted in use for motion relative to a surrounding mass of fluid and presenting:
- a fore-and-aft centerline lying parallel to said motion;
- a trailing edge relative to said motion;
- at least one swept leading edge relative to said motion, said edge presenting a spanwise tip giving rise in use to a respective primary coil-form vortex sheet;
- a single strip-form device corresponding to each said swept leading edge, said strip-form device being carried by said body and projecting rearwardly from said trailing edge at a location inboard of said spanwise tip, with none of said strips being oriented relative to the said fore-and-aft centerline in a sense opposite to that of the sweep of said swept leading edge with which it corresponds, and each said device being so located as to modify the said coil-form vortex sheet generated by the corresponding said swept leading edge so as to improve the lift-to-drag ratio of said body, said at least one said strip-form device being twisted.

12. An aerofoil body adapted in use for motion relative to a surrounding mass of fluid and presenting:
- a fore-and-aft central line lying parallel to said motion;
- a trailing edge relative to said motion;
- at least one swept leading edge relative to said motion, said edge giving rise in use to a respective primary coil-form vortex sheet;
- a single strip-form device associated with said swept leading edge, said strip-form device being carried by said body and projecting rearwardly from said trailing edge, with none of said strips being oriented relative to the said fore-and-aft center line in a sense opposite to that of the sweep of said swept leading edge with which it is associated, and each said device being so located so as to modify the said coil-form vortex sheet generated by the associated said swept leading edge so as to improve the lift-to-drag ratio of said body, said at least one said strip-form device being twisted, said at least one strip-form device and said aerofoil body presenting parallel surfaces to each other where they are attached, but in which said device is twisted along its length so that at its free end its said surface lies in a perpendicular plane.

* * * * *